Patented June 3, 1930

1,762,018

UNITED STATES PATENT OFFICE

ERWIN HOFFA AND ERWIN THOMA, OF HOCHST-ON-THE-MAIN, GERMANY, ASSIGNORS TO GENERAL ANILINE WORKS, INC., OF NEW YORK, N. Y., A CORPORATION OF DELAWARE

CHLORINE-SUBSTITUTION PRODUCTS OF 4-NITRO-1.3-DIMETHYLBENZENE AND PROCESS FOR PREPARING THEM

No Drawing. Application filed September 21, 1927, Serial No. 221,134, and in Germany October 11, 1926.

Our present invention relates to chlorine-substitution-products of 4-nitro-1.3-dimethylbenzene.

We have found that 2- and 6-chlor-4-nitro-1.3-dimethylbenzene as well as 2.6-dichlor-4-nitro-1.3-dimethylbenzene can be obtained by chlorinating the 4-nitro-1.3-dimethylbenzene alone or dissolved in a solvent, such as concentrated sulfuric acid, carbontetrachloride or chlorobenzene, preferably in the presence of a catalyst, as for instance ferric chloride, antimony pentachloride or the like, or in glacial acetic acid. Instead of chlorine there may also be used for the chlorination any other substance capable of yielding chlorine. During the chlorinating process there are at first formed the two theoretically possible monochloro compounds which are substituted in meta position to the nitro group; by chlorinating further, both monochloro compounds are converted into one and the same dichloro compound, namely the 2.6-dichlor-4-nitro-1.3-dimethylbenzene. The nitro compounds thus obtained can be reduced by one of the known methods to the corresponding amino-chloro compounds, which are identical with those obtainable by the process described in our co-pending U. S. patent application Serial No. 221,133 filed on September 21, 1927.

By our invention there are accordingly obtainable compounds of the following formula:

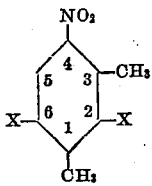

wherein X stands for chlorine or hydrogen, but at least one X represents chlorine.

These nitrochloro compounds, which show a faint yellow color, are readily soluble in organic solvents and distillable by means of water vapor.

The following examples serve to illustrate our invention, but they are not intended to limit it thereto; the parts being parts by weight:

1. 151 parts of 4-nitro-1.3-dimethylbenzene are chlorinated with 72 parts of chlorine at ordinary temperature with addition of 15 parts of antimony pentachloride. The antimony pentachloride is separated for instance by means of hydrochloric acid. The product which first crystallizes out is for the most part the 2-chlor-4-nitro-1.3-xylene. This compound may be isolated by fractional crystallization from the 6-chlor-4-nitro-1.3-xylene.

The before mentioned 2-chlor-4-nitro-1.3-xylene crystallizes from petroleum ether and has a melting point of 46° C. to 47° C. Its boiling point lies at 260° C. (uncorrected), at 131° C. under 10 mm. pressure; it is identical with the body obtainable by substituting chlorine for the amino group in the 4-nitro-2-amino-1.3-xylene. The amine which can be produced by reduction has a melting point of 48° C. to 49° C. and a boiling point of 115° C. under 8 mm. pressure.

The 6-chlor-4-nitro-1.3-dimethylbenzene is identical with the body described by Ahrens (see Liebigs Annalen der Chemie, Vol. 271, page 17) which has a melting point of 42° C. to 43° C. when recrystallized from petroleum ether, a boiling point of 262° C. (uncorrected) and a boiling point of 134° C. under 10 mm. pressure. The amine which is obtainable by reduction has a melting point of 98° C. to 99° C. and a boiling point of 128° C. under 8 mm. pressure.

2. 151 parts of 4-nitro-1.3-dimethylbenzene are dissolved in 1500 parts of carbon tetrachloride with the addition of 15 parts of sublimed ferric chloride and chlorinated with 75 parts of chlorine while cooling with ice. After expelling the carbon tetrachloride and removing the ferric chloride by means of hydrochloric acid, the separation of the chlorine compounds is carried out as indicated in Example 1.

3. 151 parts of 4-nitro-1.3-dimethylbenzene are dissolved in 1500 parts of carbon tetrachloride, mixed with 15 parts of sublimed ferric chloride and chlorinated with 170 parts of chlorine at ordinary temperature. After the chlorination process is complete, there is added to the mass, while stirring, first diluted hydrochloric acid and then water. After the carbon tetrachloride has been expelled, the 2.6-dichlor-4-nitro-1.3-dimethylbenzene is obtained. This compound forms crystals which become soft by pressure; its solidification point lies at 79° C. to 80° C., its boiling point at 149° C. under 11 mm. pressure. The amine obtainable therefrom by reduction melts at 56° C. to 57° C. and boils at 141° C. under 8 mm. pressure.

4. 151 parts of 4-nitro-1.3-dimethylbenzene are dissolved in 2000 parts of sulfuric acid of 66° Bé. in the presence of 15 parts of ferric chloride and chlorinated at ordinary temperature with 73 parts of finely subdivided chlorine. After the chlorination is complete, the mass is poured on 4000 parts of ice water. The isolation of the monochloro compounds is operated in the manner described in Example 1.

5. 151 parts of 4-nitro-1.3-dimethylbenzene are mixed in a solution of 700 parts of glacial acetic acid with 80 parts of chlorine, while cooling with ice. After having stirred the mixture for several hours, it is poured in 2800 parts of water. The operation of separating the monochloro compounds is carried out in the manner indicated in Example 1.

6. Into 152 parts of molten 1.3-dimethyl-4-nitrobenzene is introduced, while stirring, chlorine in the proportion of 2 molecules of chlorine to 1 molecule of the base in the presence of 15 parts of sublimated ferric chloride. After removal of the ferric chloride, the mass is worked up by washing it with diluted hydrochloric acid and water as indicated in Example 3.

We claim:

1. The process for preparing chlorine compounds of the following constitution:

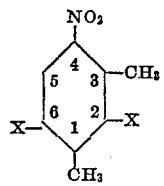

wherein X stands for chlorine or hydrogen, but at least one X represents chlorine, which consists in treating 4-nitro-1.3-dimethylbenzene with the quantity of chlorinating agent required for obtaining the desired final product.

2. The process for preparing chlorine compounds of the following constitution:

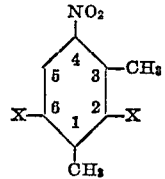

wherein X stands for chlorine or hydrogen, but at least one X represents chlorine, which consists in treating 4-nitro-1.3-dimethylbenzene with the quantity of chlorinating agent required for obtaining the desired final product in the presence of a solvent.

3. The process for preparing chlorine compounds of the following constitution:

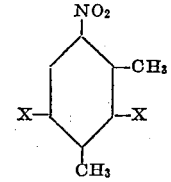

wherein X stands for chlorine or hydrogen, but at least one X represents chlorine, which consists in treating 4-nitro-1.3-dimethylbenzene with the quantity of chlorinating agent required for obtaining the desired final product in the presence of a solvent and a halogenation catalyst.

4. The process for preparing chlorine compounds of the following constitution:

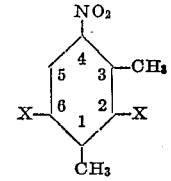

wherein X stands for chlorine or hydrogen, but at least one X represents chlorine, which consists in treating 4-nitro-1.3-dimethylbenzene with the quantity of chlorinating agent required for obtaining the desired final product in the presence of a solvent while avoiding any rise of temperature.

5. The process for preparing chlorine compounds of the following constitution:

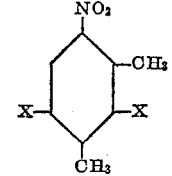

wherein X stands for chlorine or hydrogen, but at least one X represents chlorine, which consists in treating 4-nitro-1.3-dimethylbenzene with the quantity of chlorinating agent required for obtaining the desired final product in the presence of a solvent and a halogenation catalyst while avoiding any rise of temperature.

6. The process for preparing chlorine compounds of the following constitution:

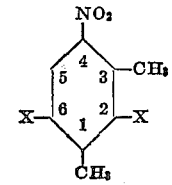

wherein X stands for chlorine or hydrogen, but at least one X represents chlorine, which consists in treating 4-nitro-1.3-dimethylbenzene with the quantity of chlorinating agent required for obtaining the desired final product, in the presence of carbon tetrachloride and ferric chloride while avoiding any rise of temperature.

7. The process for preparing 2.6-dichloro-4-nitro-1.3-dimethylbenzene, which consists in treating 4-nitro-1.3-dimethylbenzene with chlorine in the proportion of 2 molecules of chlorine to 1 molecule of the base.

8. The process for preparing 2.6-dichloro-4-nitro-1.3-dimethylbenzene, which consists in treating 4-nitro-1.3-dimethylbenzene with chlorine in the proportion of 2 molecules of chlorine to 1 molecule of the base in the presence of a solvent.

9. The process for preparing 2.6-dichloro-4-nitro-1.3-dimethylbenzene, which consists in treating 4-nitro-1.3-dimethylbenzene with chlorine in the proportion of 2 molecules of chlorine to 1 molecule of the base in the presence of a solvent and a halogenation catalyst.

10. The process for preparing 2.6-dichloro-4-nitro-1.3-dimethylbenzene, which consists in treating 4-nitro-1.3-dimethylbenzene with chlorine in the proportion of 2 molecules of chlorine to 1 molecule of the base in the presence of a solvent while avoiding any rise of temperature.

11. The process for preparing 2.6-dichloro-4-nitro-1.3-dimethylbenzene, which consists in treating 4-nitro-1.3-dimethylbenzene with chlorine in the proportion of 2 molecules of chlorine to 1 molecule of the base in the presence of a solvent and a halogenation catalyst while avoiding any rise of temperature.

12. The process for preparing 2.6-dichloro-4-nitro-1.3-dimethylbenzene, which consists in treating 4-nitro-1.3-dimethylbenzene with chlorine in the proportion of 2 molecules of chlorine to 1 molecule of the base in the presence of carbon tetrachloride and ferric chloride while avoiding any rise of temperature.

13. As a new product, the chlorine compound of the following constitution:

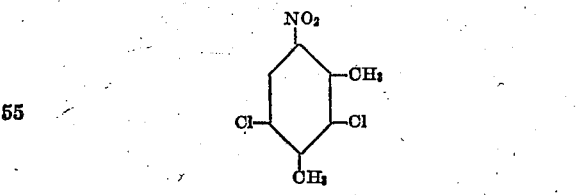

which product forms crystals, becoming soft by pressure, its solidification point lying at 79° C. to 80° C. and having a boiling point of 149° C. under 11 mm. pressure, yielding, when reduced, an amine having a melting point of 56° C. to 57° C.

14. As new products the chlorine compounds of the following constitution:

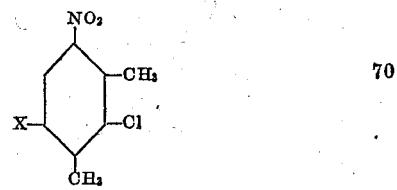

wherein X represents hydrogen or chlorine, which produces crystalline from petroleum ether, yielding when reduced amino compounds of the formula:

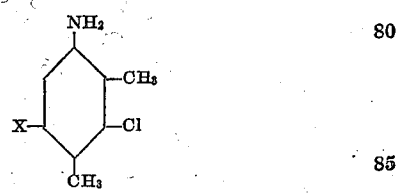

wherein X represents hydrogen or chlorine.

In testimony whereof, we affix our signatures.

ERWIN HOFFA.
ERWIN THOMA.